US011787106B2

(12) United States Patent
Gruber

(10) Patent No.: US 11,787,106 B2
(45) Date of Patent: Oct. 17, 2023

(54) METHOD FOR THE LITHOGRAPHY-BASED ADDITIVE MANUFACTURING OF A THREE-DIMENSIONAL COMPONENT

(71) Applicant: UPNANO GMBH, Vienna (AT)

(72) Inventor: Peter Gruber, Vienna (AT)

(73) Assignee: UPNANO GMBH, Vienna (AT)

( * ) Notice: Subject to any disclaimer, the term of this patent is extended or adjusted under 35 U.S.C. 154(b) by 145 days.

(21) Appl. No.: 17/431,677

(22) PCT Filed: Feb. 26, 2020

(86) PCT No.: PCT/IB2020/051626
§ 371 (c)(1),
(2) Date: Aug. 17, 2021

(87) PCT Pub. No.: WO2020/174411
PCT Pub. Date: Sep. 3, 2020

(65) Prior Publication Data
US 2022/0118691 A1      Apr. 21, 2022

(30) Foreign Application Priority Data
Feb. 26, 2019   (EP) ..................................... 19450004

(51) Int. Cl.
*B29C 64/135*       (2017.01)
*B29C 64/268*       (2017.01)
(Continued)

(52) U.S. Cl.
CPC .......... *B29C 64/135* (2017.08); *B29C 64/124* (2017.08); *B29C 64/236* (2017.08);
(Continued)

(58) Field of Classification Search
CPC .................................................. B29C 64/135
See application file for complete search history.

(56) References Cited

U.S. PATENT DOCUMENTS 5,597,520 A * 1/1997 Smalley .................. G06T 17/00
                                                                    118/712
6,264,873 B1 * 7/2001 Gigi ....................... G03F 7/0037
                                                                    264/401
(Continued)

FOREIGN PATENT DOCUMENTS

DE            10111422 A1      9/2002
DE        102017110241 A1     11/2018
(Continued)

OTHER PUBLICATIONS

International Search Report dated Apr. 23, 2020, issued in corresponding International Application No. PCT/IB2020/051626 with English translation (5 pgs.).
(Continued)

*Primary Examiner* — Atul P. Khare
(74) *Attorney, Agent, or Firm* — Pillsbury Winthrop Shaw Pittman, LLP

(57) ABSTRACT

In a method for the lithography-based generative production of a three-dimensional component, in which electromagnetic radiation emitted by an irradiation device is successively focused on focal points within a material, wherein in each case a volume element of the material located at the focal point is solidified by means of multiphoton absorption, wherein a substructure is each built up from the volume elements in a writing area of the irradiation device, the build-up of the component comprises the following steps: a) a plurality of substructures are arranged next to one another, then b) substructures are arranged one above the other so that upper substructures bridge the interface(s) between lower substructures arranged next to one another.

19 Claims, 4 Drawing Sheets

Figure 1:
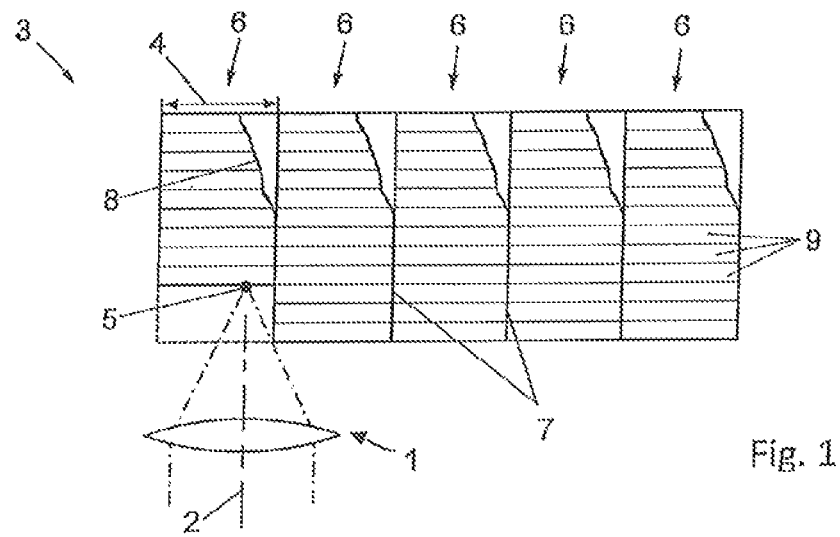

(51) Int. Cl.
  *B33Y 10/00*      (2015.01)
  *B29C 64/245*     (2017.01)
  *B29C 64/236*     (2017.01)
  *B29C 64/286*     (2017.01)
  *B29C 64/124*     (2017.01)

(52) U.S. Cl.
  CPC .......... *B29C 64/245* (2017.08); *B29C 64/268* (2017.08); *B29C 64/286* (2017.08); *B33Y 10/00* (2014.12); *B29K 2995/0097* (2013.01)

(56) References Cited

U.S. PATENT DOCUMENTS

| | | | |
|---|---|---|---|
| 7,931,851 B2 * | 4/2011 | Ueno | B29C 64/129 |
| | | | 264/401 |
| 10,118,376 B2 * | 11/2018 | Reiner | G05B 19/4099 |
| 11,179,883 B2 * | 11/2021 | Tanguy | B33Y 50/00 |
| 2019/0255773 A1 * | 8/2019 | Ovsianikov | B33Y 30/00 |

FOREIGN PATENT DOCUMENTS

| | | |
|---|---|---|
| EP | 3093123 A1 | 11/2016 |
| WO | 2018/006108 A1 | 1/2018 |
| WO | WO-2018172079 A1 * | 9/2018 |

OTHER PUBLICATIONS

Zipfel et al., "Nonlinear magic: multiphoton microscopy in the biosciences", Nature Biotechnology, vol. 21, No. 11, Nov. 2003, pp. 1369-1377.

* cited by examiner

METHOD FOR THE LITHOGRAPHY-BASED ADDITIVE MANUFACTURING OF A THREE-DIMENSIONAL COMPONENT

CROSS-REFERENCE TO RELATED APPLICATIONS

This application is the U.S. national stage entry of PCT/IB2020/051626, filed Feb. 26, 2020, which claims priority to European Patent Application No. 19450004.7, filed Feb. 26, 2019, the contents of both of which are herein incorporated by reference in their entireties.

The invention refers to a method for the lithography-based generative production of a three-dimensional component, in which electromagnetic radiation emitted by an irradiation device is successively focused on focal points within a material, wherein in each case a volume element of the material located at the focal point is solidified by means of multiphoton absorption, wherein a substructure is each built up from the volume elements in a writing area of the irradiation device, and a plurality of substructures are arranged next to one another.

A method for forming a shaped body in which the solidification of a liquid photosensitive material is carried out by means of multiphoton absorption is known, for example, from DE 10111422 A1. For that purpose, a focused laser beam is radiated into the bath of the photosensitive material, whereby the irradiation conditions for a multiphoton absorption process that triggers the solidification are only met in the immediate vicinity of the focus, so that the focus of the beam is guided within the bath volume to the areas to be solidified according to the geometric data of the shaped body to be produced. In the method according to DE 10111422 A1, the material bath is irradiated from above, the radiation intensity being selected so that the liquid is essentially transparent to the radiation above the focal point, so that direct polymerization of the bath material takes place in a location-selective manner within the bath volume, i.e., also far below the bath surface.

Irradiation devices for multiphoton absorption methods comprise optics for focusing a laser beam and a deflection device for deflecting the laser beam. Due to their design, such irradiation devices have a limited writing area within which the deflection device moves the laser beam. The specified writing area is usually smaller than the volume required for the component to be manufactured. The component must therefore be divided into a plurality of substructures, which each correspond to a writing area and are built up one after the other. After the construction of a substructure, the irradiation device for the construction of the next substructure is displaced relative to the material and the next substructure is written directly to the preceding substructure. This so-called "stitching" can cause a discontinuity in the interface area between two adjacent substructures, which forms a mechanical weak point in the component.

When using multiphoton absorption methods, another problem is that already formed solidified structures shadow areas to be structured subsequently. This means that the radiation introduced into the material for the solidification would in certain cases have to penetrate structural areas that have already been solidified in order to reach the volume element to be solidified. Such shadowing can lead to structuring errors.

EP 3093123 A1 describes a method which avoids shadowing in that the enveloping boundary surfaces between adjacent substructures run inclined to the main direction of the beam entry. The enveloping boundary surfaces of the substructure run at an angle to the main direction of the beam entry in such a way that covering or shadowing of the beam entry along the main direction by existing substructures is avoided. It is therefore possible to choose a depth that is comparatively large in terms of magnitude along the main direction for the substructure. It is therefore necessary to divide the overall structure only into a comparatively small number of substructure blocks in order to produce the overall structure.

The present invention aims to provide an improved method with which not only the problem of shadowing is taken into account, but also the susceptibility of the component to mechanical breakage caused by the stitching method is improved.

To solve this problem, the invention provides for a method of the type mentioned at the outset, wherein the construction of the component comprises the following steps: a) a plurality of substructures is arranged next to one another, then b) substructures are arranged one above the other so that upper substructures bridge the interface(s) between lower substructures arranged next to one another. Because the component is divided not only into substructures lying next to one another, but also into substructures lying one above the other, the thickness of the substructures can be selected to be smaller. In particular, the thickness of the substructures can be selected to be so small that there is no shadowing.

It can preferably be provided that the component comprises several superimposed layers, which are each formed from a plurality of substructures arranged next to one another, wherein the component is built up in layers, wherein the substructures of an upper layer bridge the interface(s) between adjacent substructures of the layer arranged immediately below. To form a lower layer, several substructures can first be built up next to one another before the substructures of the next, upper layer are built up immediately thereabove. As a result, shadowing is significantly reduced or, if the layers are made correspondingly thin, completely avoided, because the shadow is only generated by the height of a layer. The invention thus takes a different approach than EP 3093123 A1, where the component is only built up from substructures arranged next to one another, i.e., from a single layer.

In the method according to the invention, unlike the solution according to EP 3093123 A1, no comparatively large depth along the main direction is selected for each substructure, but the depth of the substructures is limited to the thickness of a layer, which in turn is not selected to be greater than the shadow-free penetration depth.

In the context of the present invention, it is therefore possible to dispense with the formation of interfaces running obliquely to the entry direction between two adjacent substructures, as a result of which the control effort for the structuring device is reduced. Rather, the interfaces preferably run parallel to the entry direction.

However, it is also conceivable that within the scope of the invention, as in the solution according to EP 3093123 A1, interfaces running at an angle to the entry direction are formed between two adjacent substructures.

The layered structure of the component also makes it possible to improve the mechanical stability in that the substructures of a layer bridge the interface(s) between adjacent substructures of the layer immediately below. This creates an offset between the substructures of the individual layers, similar to the offset of bricks in a masonry bond. Due to the offset, the weak points occurring due to the joints or interfaces between two adjacent substructures of a layer are compensated and, in particular, the propagation of cracks along the interfaces in the component is prevented.

In the context of the invention, a substructure is understood to mean an area of the body to be produced which corresponds to the writing area of the irradiation device and whose thickness, measured in the direction of the entry direction, corresponds to the thickness of one layer in the case of a layered structure. In order to form a plurality of substructures, it is preferably provided that the writing area of the irradiation device is displaced by changing the relative position of the irradiation device relative to the material transversely to the entry direction of the irradiation device in order to build up, after a substructure has been built up, a next substructure. In this case, either the irradiation device can be displaced relative to the stationary material or the material or the container receiving the material can be displaced relative to the stationary irradiation device.

If, within the scope of the invention, substructures are addressed that are adjacent to one another, this means that the writing area of the irradiation device is displaced transversely to the entry direction as described above in order to produce first one and then the other of the adjacent substructures. Substructures lying next to one another are thus substructures which directly adjoin one another transversely to the entry direction of the irradiation device.

Preferably, the interface between layers lying one on top of the other layer is flat throughout. The adjacent substructures that form a layer thus have the same thickness, so that a layer of uniform thickness results. The layers here extend transversely to the entry direction.

Alternatively, however, the interface between substructures lying one on top of the other can also be designed in a stepped manner. In particular, it is advantageous if an upper substructure has a surface on its underside which has a step at the interface between two lower substructures. In particular, it is advantageous if a lower substructure has a surface on its upper side which has a step at the interface between two upper substructures. Due to such a stepped configuration, the thickness of an adjacent substructure appears to be lower by the height of the step, so that the shadowing effect can be further reduced or the thickness of the substructures can be increased by the height of the step without worsening the shadowing conditions.

In this context, an advantageous embodiment provides that the height of the step is selected to be 10-50%, in particular 20-40%, of the thickness (measured in the height direction) of the substructure.

For a satisfactory mechanical stability of the component, the offset of the substructures lying one on top of the other is preferably designed in such a way that the substructures are sufficiently covered or overlapping. According to a preferred embodiment, two lower substructures adjoining one another at an interface are each overlapped by at least 10%, preferably at least 30%, particularly preferably at least 40%, in particular 50%, by the upper substructure that bridges this interface.

In order to avoid that an already built substructure shadows neighboring areas of an adjacent substructure of the same layer, it is preferably provided that the thickness of the substructures and/or the layers is less than 100 µm, preferably less than 50 µm, preferably less than 30 µm, in particular less than 10 µm. In particular, the thickness of the substructures and/or the layers is at most 10 µm with a numerical aperture of the irradiation system of 1.4, at most 30 µm with a numerical aperture of the irradiation system of 0.8 and at most 50 µm with a numerical aperture of the irradiation system of 0.4.

The individual substructures can be built up in layers, i.e. made from several layers.

A particularly preferred procedure results when the material is present on a material carrier, such as, for example, in a vat, and the material is irradiated from below through the material carrier which is at least partially transparent to the radiation. Herein, a building platform may be positioned at a distance from the material carrier and the component is built up on the building platform by solidifying material located between the building platform and the material carrier. Alternatively, it is also possible to irradiate the material from above.

The structuring of a suitable material by means of multiphoton absorption offers the advantage of an extremely high structural resolution, with volume elements with minimal structural sizes of up to 50 nm×50 nm×50 nm being achievable. Due to the small focal point volume, the throughput of such a method is very low, since, for example, a total of more than $10^9$ points must be exposed for a volume of 1 mm$^3$. This leads to very long construction times, which is the main reason for the low industrial use of multiphoton absorption processes.

In order to increase the component throughput without losing the possibility of high structural resolution, a preferred development of the invention provides that the volume of the focal point is varied at least once during the construction of the component, so that the component is made up of solidified volume elements of different volumes.

Due to the variable volume of the focal point, high resolutions are possible (with a small focal point volume). At the same time (with a large focal point volume) a high writing speed (measured in mm$^3$/h) can be achieved. By varying the focal point volume, a high resolution can be combined with a high throughput. The variation of the focal point volume can be used, for example, in such a way that a large focal point volume is used inside the component to be built in order to increase the throughput, and a smaller focal point volume is used on the surface of the component in order to form the component surface with high resolution. An increase in the focal point volume enables a higher structuring throughput, since the material volume solidified in an exposure process is increased. In order to maintain a high resolution with high throughput, small focal point volumes can be used for finer structures and surfaces, and larger focal point volumes can be used for coarse structures and/or for filling interior spaces.

In a preferred procedure, the focal volume is varied in such a way that the volume ratio between the largest focal point volume during the manufacture of a component and the smallest focal point volume is at least 2, preferably at least 5.

The principle of multiphoton absorption is used in the context of the invention to initiate a photochemical process in the photosensitive material bath. Multiphoton absorption methods also include methods of 2-photon absorption, for example. As a result of the photochemical reaction, the material changes into at least one other state, with photopolymerization typically occurring. The principle of multiphoton absorption is based on the fact that the aforementioned photochemical process only takes place in those areas of the beam path in which there is a photon density sufficient for multiphoton absorption. The highest photon density occurs in the focal point of the optical imaging system, so that the multiphoton absorption occurs with sufficient probability only in the focal point. Outside the focal point, the photon density is lower, so that the probability of multiphoton absorption outside the focal point is too low to cause an irreversible change in the material through a photochemical reaction. The electromagnetic radiation can pass through the material largely unhindered in the wavelength used and there is an interaction between photosensitive material and electromagnetic radiation only at the focal point. The principle of multiphoton absorption is described, for example, in Zipfel et al, "*Nonlinear magic: multiphoton microscopy in the biosciences*", NATURE BIOTECHNOLOGY VOLUME 21 NUMBER 11 NOVEMBER 2003.

The source for the electromagnetic radiation can preferably be a collimated laser beam. The laser can emit one or more, fixed or variable wavelengths. In particular, it is a continuous or pulsed laser with pulse lengths in the nanosecond, picosecond or femtosecond range. A pulsed femtosecond laser offers the advantage that a lower average power is required for the multiphoton absorption.

Photosensitive material is understood to mean any material that is flowable under construction conditions and that changes into a second state through multiphoton absorption in the focal point volume—for example through polymerization. The material change must be limited to the focal point volume and its direct environment. The change in the substance properties can be permanent and consist, for example, in a change from a liquid to a solid state, but it can also be only temporary. A permanent change can also be reversible or irreversible. The change in the material properties does not necessarily have to pass completely from one state to the other, but can also be a mixed form of both states.

The performance of the electromagnetic radiation and the exposure time influence the quality of the component produced. By adapting the radiation power and/or the exposure time, the volume of the focal point can be varied within a narrow range. If the radiation output is too high, additional processes occur that can damage the component. If the radiation output is too low, no permanent change in material properties can occur. For every photosensitive material there are therefore typical construction process parameters that are associated with good component properties.

However, the variation in the focal point volume described above is not based on a change in the intensity of the electromagnetic radiation used. Rather, the (optimal) radiation intensity selected for the construction process is used, which is left unchanged during the construction of the component. The method is therefore preferably carried out in such a way that the change in the focal point volume is carried out with the radiation intensity remaining the same, the average power of the electromagnetic radiation used being chosen accordingly.

The volume of an exposed point after the preparation step with the typical construction process parameters is therefore understood as the focal point volume. The change in the focal point volume described above is understood to mean a change in the spatial Intensity distribution in the focal point. The spatial intensity distribution of the focal point can be changed in one or more directions. For example, by reducing the effective numerical aperture of the optical imaging system, the intensity distribution can be increased in all three spatial directions. When using a diffractive optical element, the focus can be changed to a line or area, or the number of focal points can be increased.

A number of equipment options for changing the focal point volume are described in WO 2018/006108 A1.

Preferably, the change in the focal point volume takes place in at least one, preferably two, in particular in three spatial directions perpendicular to one another.

In particular, the electromagnetic radiation may be deflected by means of a deflection unit in order to adjust the focal point within the writing area in a plane that is essentially perpendicular to the entry direction.

Figure 2:
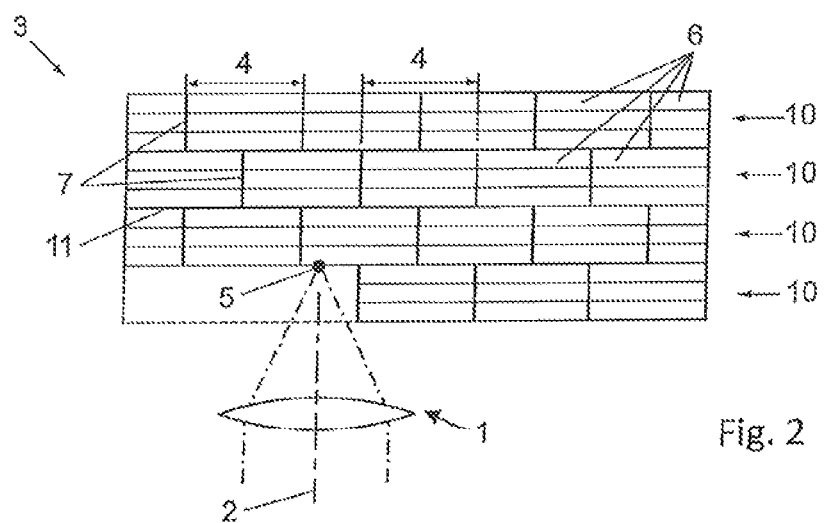
Figure 3:
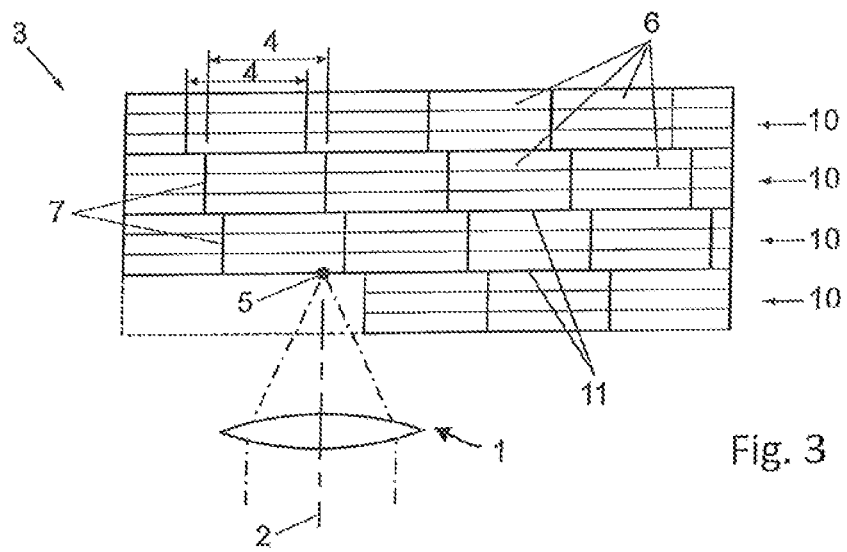
Figure 4:
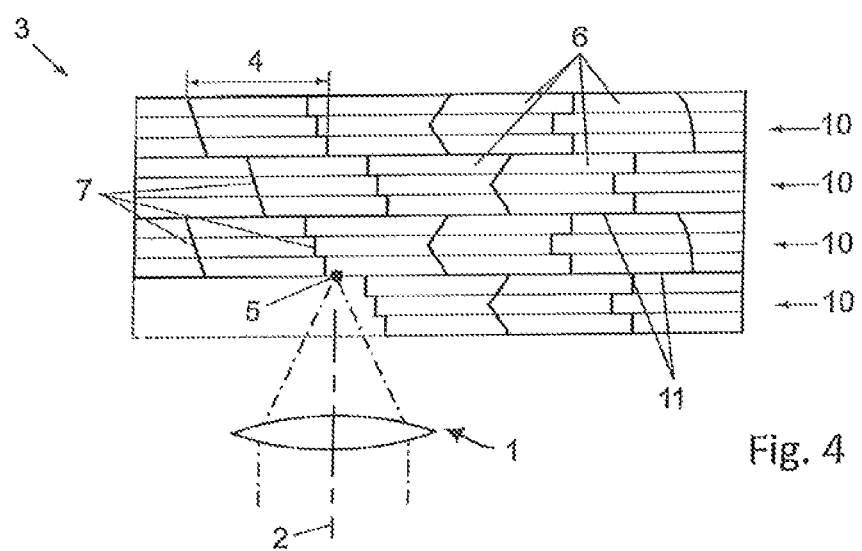
Figure 5:
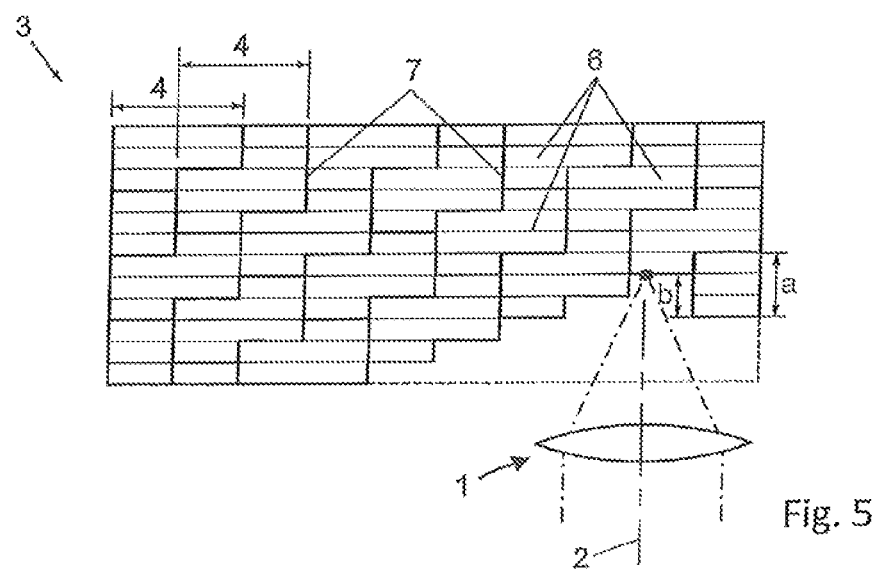
Figure 6:
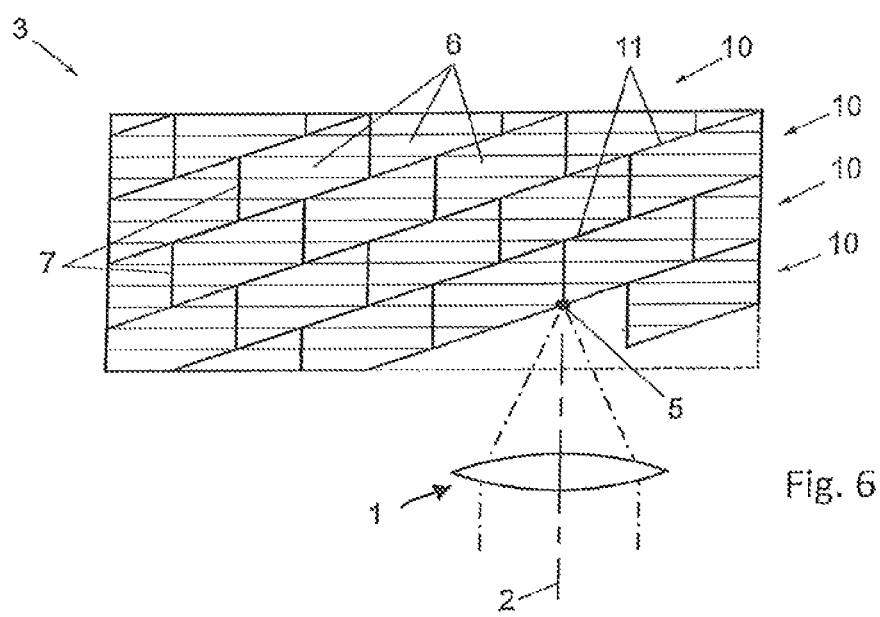
Figure 7:
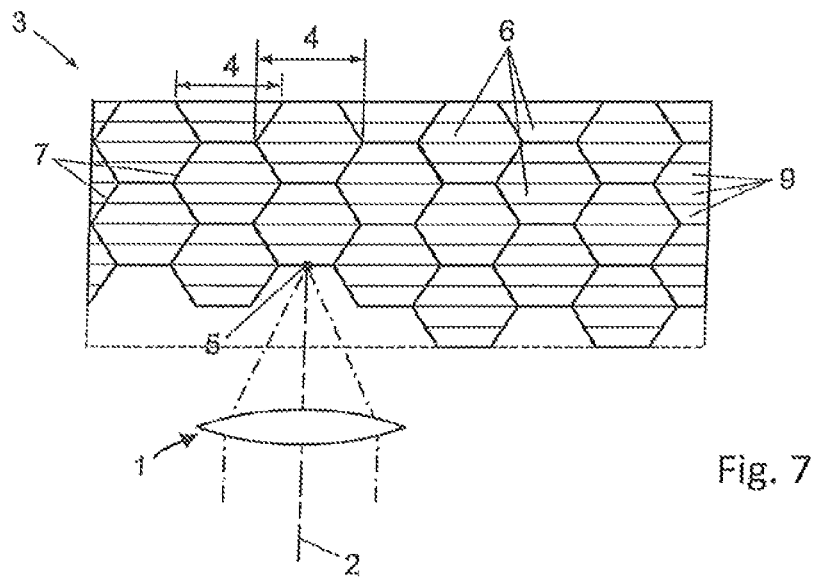
Figure 8:
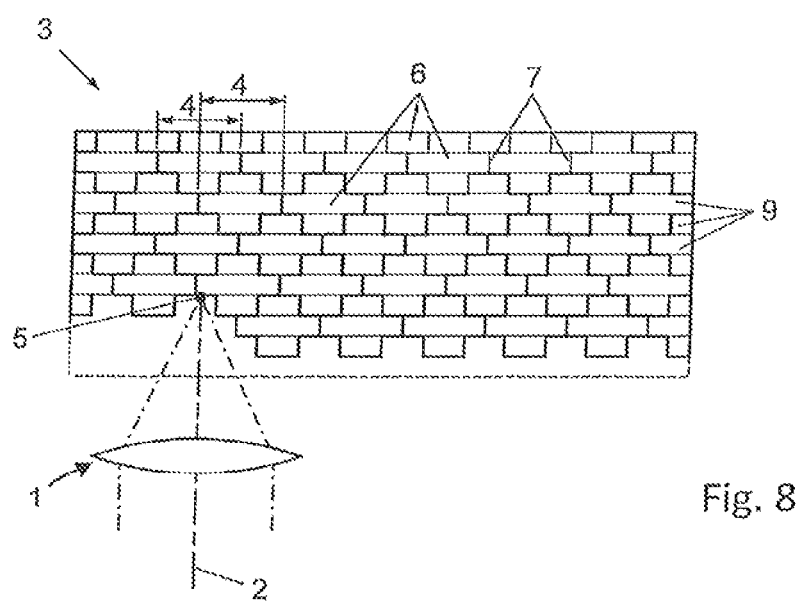

The invention is explained in more detail below with reference to exemplary embodiments shown schematically in the drawing. Therein, FIG. 1 shows a schematic representation of a conventional method for building a three-dimensional component, FIG. 2 shows a method according to the invention, FIG. 3 shows a modified embodiment of the method according to FIG. 2, FIG. 4 shows a further modified embodiment of the method according to FIG. 2, FIG. 5 show a further modified embodiment of the method according to FIG. 2, FIG. 6 shows another modified embodiment of the method according to FIG. 2, and FIGS. 7 and 8 show further modified embodiments.

In FIG. 1, an optical unit 1 of an irradiation device is shown schematically in cross section, which has an entry direction 2. The entry direction 2 indicates the direction in which the electromagnetic radiation is emitted from the irradiation device onto the component 3 to be formed in the basic setting. The irradiation device has a writing area with an extension 4 which corresponds to the width within which the emitted radiation can be focused on focal points 5 within the material which is to be solidified by the radiation. In order to be able to focus one after the other on different focal points within the writing area, the irradiation device comprises a unit not shown in detail, such as a deflection unit. If said unit is designed to change the direction of irradiation, the term "entry direction" is to be understood as the main entry direction of the irradiation device in the basic position.

Since the extension 4 of the writing area is not sufficient to produce the entire component, the component is built up from a plurality of substructures 6 arranged next to one another. The procedure here can be such that the substructure 6 is built up from a plurality of layers 9 in the height direction. First, a first substructure 6 is formed, which lies within the writing area of the irradiation device. Thereafter, the writing area is displaced laterally by moving the irradiation device relative to the component 3 or by moving the component 3 relative to the irradiation device in order to build up a second substructure 6 next to the first substructure 6. This is repeated until the finished component 3 has been built up from all the substructures. A component constructed in this way has mechanical weak points at the interfaces 7 between substructures 6 arranged next to one another.

Furthermore, when a certain height of a substructure 6, measured in the entry direction, is exceeded, shadowing occurs. This means that an already built-up substructure 6 can shadow the beam coming from the optical unit 1 and directed to a focal point within the substructure adjoining it on the left, as is shown schematically with the aid of line 8. In the area delimited by line 8, there are therefore structuring errors that must be avoided.

In FIG. 2 it can be seen that the component 3 is built up again from a plurality of substructures 6 according to the method according to the invention, the substructures 6 now not only being arranged next to one another but also one above the other. In the embodiment according to FIG. 2, the substructures 6 are for this purpose arranged in layers 10 arranged one above the other, so that the interface 11 between layers 10 lying one above the other is continuously flat. Because the component 3 is composed not only in the lateral direction but also in the height direction from a plurality of substructures 6, each individual substructure 6 can be designed with a reduced height with a view to avoiding shadowing. This also opens up the possibility of laterally offsetting the substructures 6 of the individual layers 10 with respect to one another, so that upper substructures 6 bridge the interfaces 7 between substructures 6 arranged next to one another and directly below. In the embodiment according to FIG. 2, the lateral offset is half the width of the individual substructures 6, so that two lower substructures 6 adjoining one another at an interface 7 are each 50% overlapped by the upper substructure 6 bridging this interface 7.

In the modified embodiment according to FIG. 3, the offset is only 10%.

While the interfaces 7 between substructures 6 arranged next to one another run parallel to the entry direction 2, FIG. 4 shows various alternative possibilities, namely curved and stepped interfaces 7 as well as interfaces 7 running obliquely to the entry direction 2. In this way, shadowing can also be prevented.

In FIG. 5, a further modified embodiment is shown, in which the substructures 6 lying one above the other are not arranged in layers, but rather according to a stepped arrangement. The substructures 6 each have a surface on their underside and on their upper side which has a step at the point at which an interface 7 is provided between substructures lying below or above it. Due to such a stepped configuration, the protruding portion b of the height a of a substructure 6 relevant with regard to shadowing is lower than in an embodiment according to FIG. 2, so that shadowing can be avoided even more effectively or the height of the substructures can be increased without increasing the risk of shadowing.

In FIG. 6 an alternative arrangement of the substructures 6 is shown, the interfaces 11 between superimposed substructures 6 or between the layers 10 now not extending at right angles to the entry direction 2, but obliquely the entry direction 2 at an angle of max. 45°, preferably max. 30°.

FIG. 7 shows a further possibility for the arrangement of the substructures 6 according to the invention. The substructures 6 here have a hexagonal cross-section, so that a honeycomb arrangement of substructures arranged next to one another and one above the other results.

In the embodiment according to FIG. 8, the substructures 6 are in the form of crosses.

It should be noted that the substructures 6 as shown in FIGS. 1 to 8 are only represented by border lines which indicate the spatial area in which the solidification of the volume elements takes place within the respective substructure without a specific structuring being represented. It goes without saying that within the framework of the production of a component of the respectively desired geometry, not all volume elements have to be solidified within a substructure, but that volume areas can remain free within the substructures.

The invention claimed is:

1. A method for the lithography-based generative production of a three-dimensional component, in which electromagnetic radiation emitted by an irradiation device is successively focused on focal points within a material, wherein in each case of the successive focusing a volume element of the material located at the focal point is solidified by means of multiphoton absorption, wherein a substructure is built up from the volume elements in a writing area of the irradiation device and a plurality of the substructures are built up by displacing the writing area to different positions within the material, and wherein the component comprises several superimposed layers of the substructures arranged next to one another in each of the layers so as to define respective interfaces between adjacent ones of the substructures, characterized in that the is built up by first forming a lower layer of the substructures and then forming an upper layer of the substructures immediately above the lower layer so that substructures of the upper layer bridge respective ones of the interfaces between substructures of the lower layer, wherein the interfaces are defined by several superimposed layer portions of the solidified material.

2. The method according to claim 1, characterized in that the interface(s) a flat interface is defined between the substructure layers lying one on top of the other.

3. The method according to claim 1, characterized in that a stepped interface is defined between the substructure layers lying one above the other.

4. The method according to claim 1, characterized in that the writing area of the irradiation device is displaced by changing a relative position of the irradiation device relative to the material transversely to an entry direction of the electromagnetic radiation into the material in order to build up, after a respective one of the substructures has been built up, a next adjacent one of the substructures.

5. The method according to claim 1, characterized in that two lower substructures adjoining one another at a respective one of the interfaces are each overlapped by at least 10% by a respective one of the substructures bridging said interface.

6. The method according to claim 5, characterized in that the overlapping is by at least 30%.

7. The method according to claim 6, characterized in that the overlapping is by at least 40%.

8. The method according to claim 7, characterized in that the overlapping is by 50%.

9. The method according to claim 1, characterized in that the thickness of the substructures and/or of the layers is less than 100 μm.

10. The method according to claim 9, characterized in that the thickness is less than 50 μm.

11. The method according to claim 10, characterized in that the thickness is less than 30 μm.

12. The method according to claim 11, characterized in that the thickness is less than 10 μm.

13. The method according to claim 1, characterized in that the material is present on a material carrier and the material is irradiated from below through the material carrier which is at least partially transparent to the electromagnetic radiation.

14. The method according to claim 13, characterized in that a building platform is positioned at a distance from the material carrier and the three-dimensional component is built up on the building platform by solidifying a portion of the material located between the building platform and the material carrier.

15. The method according to claim 1, characterized in that a volume of the focal point is varied at least once during construction of the three-dimensional component, so that the three-dimensional component is built up from solidified volume elements of different volumes.

16. The method according to claim 15, characterized in that a change in the focal point volume takes place in at least two spatial directions perpendicular to one another.

17. The method according to claim 1, characterized in that the electromagnetic radiation is deflected by means of a deflection unit in order to adjust the focal point within the writing area in a plane that is essentially perpendicular to an entry direction of the electromagnetic radiation into the material.

18. The method according to claim 1, characterized in that the interfaces each define a boundary at which the successive focusing terminates for a respective one of the substructure layer portions before continuing for an adjacent one of the substructure layer portions.

19. The method according to claim 1, characterized in that each of opposing ones of the interfaces for a respective one of the substructures comprise a portion extending across several of the superimposed layers both outwardly toward and inwardly from an adjacent one of the substructures.

* * * * *